US008593302B2

(12) United States Patent
Auer

(10) Patent No.: US 8,593,302 B2
(45) Date of Patent: Nov. 26, 2013

(54) VEHICLE TREATMENT INSTALLATION AND METHOD FOR ITS OPERATION

(75) Inventor: Robert Auer, Stadtbergen (DE)

(73) Assignee: WashTec Holding GmbH, Augsburg (DE)

( * ) Notice: Subject to any disclaimer, the term of this patent is extended or adjusted under 35 U.S.C. 154(b) by 398 days.

(21) Appl. No.: 12/922,218

(22) PCT Filed: Feb. 23, 2010

(86) PCT No.: PCT/EP2010/052285
§ 371 (c)(1),
(2), (4) Date: Nov. 2, 2010

(87) PCT Pub. No.: WO2010/118908
PCT Pub. Date: Oct. 21, 2010

(65) Prior Publication Data
US 2011/0043379 A1    Feb. 24, 2011

(30) Foreign Application Priority Data
Apr. 17, 2009 (DE) .................. 10 2009 017 569

(51) Int. Cl.
*G08G 1/08* (2006.01)
(52) U.S. Cl.
USPC ........ 340/928; 340/932.2; 340/933; 340/937; 340/943; 340/673; 134/18; 134/45; 134/56 R; 134/123; 356/601; 356/607; 356/608
(58) Field of Classification Search
USPC .............. 340/928, 932.2, 933, 937, 943, 673, 340/425.5; 134/18, 123, 45, 56 R; 356/601, 356/607, 608
See application file for complete search history.

(56) References Cited

U.S. PATENT DOCUMENTS 3,596,241 A * 7/1971 Migneault .................. 340/932.2
4,981,523 A * 1/1991 Larson et al. .................. 134/18
(Continued)

FOREIGN PATENT DOCUMENTS

| DE | 202008003961 | 6/2008 |
| EP | 1090235 | 4/2001 |
| JP | 60128047 | 7/1985 |
| WO | 99/61295 | 12/1999 |
| WO | 03/082642 | 10/2003 |

OTHER PUBLICATIONS

International Search Report dated Apr. 28, 2010 for PCT/EP2010/052285 filed Feb. 23, 2010.
(Continued)

*Primary Examiner* — Tai T Nguyen
(74) *Attorney, Agent, or Firm* — Fleitt Gibbons Gutman Bongini & Bianco PL; Martin Fleit; Paul D. Bianco

(57) ABSTRACT

The invention relates to a vehicle treatment installation with a drive-in area for a vehicle to be treated, a treatment gantry that can move along a drive-in direction, and at least one camera for creating an image of the drive-in area and vehicle. Such known vehicle treatment installations often fail and/or are maintenance-intensive. The task of providing an installation and also a method for its operation that simplifies, with simple means, the drive-in process into the correct treatment position for the driver of a vehicle to be treated is achieved by a display device that is visible to the driver of the vehicle during the drive-in process, and at least one mark. The subject matter of the invention is also a method for the operation of the vehicle treatment installation.

20 Claims, 2 Drawing Sheets

(56) References Cited

U.S. PATENT DOCUMENTS

| | | | |
|---|---|---|---|
| 6,661,516 B1 | 12/2003 | Dietsch | |
| 6,709,530 B1 * | 3/2004 | Dietsch et al. | 134/18 |
| 6,992,595 B2 | 1/2006 | Auer | |
| 7,764,196 B2 * | 7/2010 | Spears | 340/933 |
| 8,115,654 B2 * | 2/2012 | Schmid | 340/932.2 |

OTHER PUBLICATIONS

Written Opinion received Apr. 2010 for PCT/EP2010/052285 filed Feb. 23, 2010.

International Preliminary Report on Patentability published Oct. 18, 2011 for PCT/EP2010/052285.

* cited by examiner

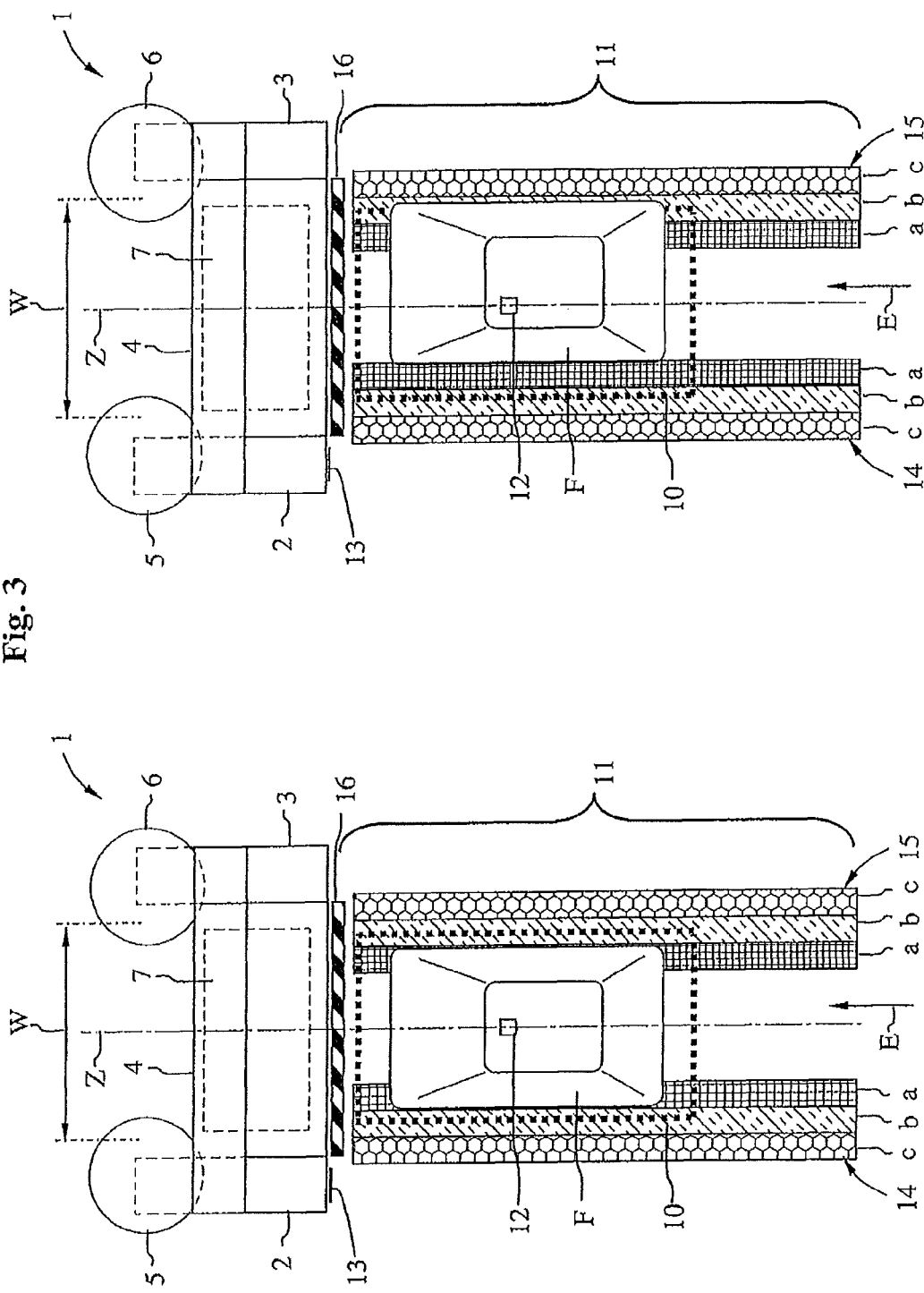

VEHICLE TREATMENT INSTALLATION AND METHOD FOR ITS OPERATION

FIELD OF THE INVENTION

The invention relates to a vehicle treatment installation and also to a method for its operation.

BACKGROUND OF THE INVENTION

In the case of known vehicle treatment installations, in particular, self-operated vehicle washing installations, the driver must drive the vehicle to be treated into a specified treatment position. The vehicle is parked there, the driver gets out of the vehicle, and usually starts the treatment program at an input device provided for this purpose on the vehicle treatment installation. Then a treatment gantry with treatment devices arranged thereon, e.g., rotating horizontal and vertical washing brushes or high-pressure cleaning devices, moves once or multiple times over the vehicle starting at the vehicle front toward the vehicle rear end and executes the selected treatment program. In order to achieve optimal treatment, the vehicle must be brought as exactly as possible into the specified treatment position, usually up to a specified stop position in the driving-in direction of the vehicle and centered relative to the open treatment width between gantry posts of the treatment gantry perpendicular to the driving-in direction of the vehicle.

In the case of such vehicle treatment installations, however, the vehicle must be positioned by the driver himself as exactly as possible in the treatment position—which is different than drive-through installations that transport the vehicle in a guided and externally driven way. Many drivers, however, have great difficulties in driving the vehicle easily into the treatment position. Consequently, numerous attempts have already been made to guide the driver into the treatment position by means of different driving aids.

A simple device to help the driver to position the vehicle in the treatment position emerges from JP 60128047 A, which relates to a vehicle washing installation with a washing gantry. In order to bring a vehicle there into the correct treatment position, four rows of knob marks are arranged in the drive-in area of the vehicle washing installation on the base in the area of the wheels of the entering vehicle. So that the driver can recognize the position of his vehicle relative to these knob marks during the drive-in process, mirrors are arranged on the vertical gantry posts of the washing gantry and also on the gantry traverse running perpendicular and connecting these gantry posts. In this simple construction, there is a large disadvantage in that the viewing angle between the driver, mirrors, and the knob marks and vehicle changes continuously during the drive-in process due to the fixed mirrors. In this way, the reflected images of the knob marks and the vehicle that can be seen in the mirrors change continuously, so that the driver quickly becomes confused. If the vehicle enters incorrectly, the driving direction must be changed during the drive-in process, so the reflected images also change. Also, most drivers have problems in correctly reading the assignment of the vehicle movements displayed "mirror-inverted." In this way, the steering correction is often in the wrong direction, so the incorrect position of the vehicle is amplified even more. The drive-in aid with mirrors also has the disadvantage that if there is not uniform lighting of the vehicle washing installation or if light is reflected by the mirrors toward the driver due to light reflections from the vehicle surfaces and vehicle panels, then the driver is temporarily or repeatedly blinded. In the humid environment of a vehicle washing installation, it is also a factor that the mirrors are quickly covered with condensation or dirtied by water drops, so that the mirror images are no longer visible or are only dimly visible.

An alternative drive-in aid according to the class is disclosed in EP 1 090 235 B1. There, the vehicle position of the entering vehicle is determined exactly with a complicated measurement arrangement. With this position data and desired position data stored in the controller of the vehicle washing installation, driving-direction instructions are calculated and then displayed to the driver, showing him in which direction he must steer in order to correctly position his vehicle if it is entering in an incorrect direction. Such complex systems require a high degree of measurement and computational expense, because the driving-direction instructions must be calculated and displayed in real time. In addition, it has been shown that the drivers of entering vehicles often interpret the displayed driving-direction instructions incorrectly or overreact to these instructions and over-steer. Especially for the case of over-steering, the short drive-in area of a vehicle treatment installation results in the vehicle being driven into a position significantly deviating from the desired treatment position, and these position errors are usually made even worse by multiple back-and-forth steering. The errors often can be corrected only by driving out of the treatment installation and driving in again. Often a vehicle is positioned worse due to these drive-in aids than if there were no drive-in aids.

From DE 20 2008 003 961 U1, a vehicle treatment installation is known with a housing that has one or more display devices, e.g., in the form of a flat monitor. Displays of vehicle treatment programs, advertisements, product offers by the installation operator, vehicle treatment tips, current images of the vehicle treatment being performed, or instructions on performing the vehicle treatment could be displayed in the display device. As the drive-in aid, however, this vehicle treatment installation still has the known instruction lights described above in the form of drive-forward and back-up arrows or a STOP light, leading to the problems described above when the vehicle is driven in.

SUMMARY OF THE INVENTION

Therefore, the invention is based on the task of disclosing a vehicle treatment installation and also a method for its operation that overcome the disadvantages named above and simplify, with simple, quickly comprehensible means, the process of driving into the correct treatment position of a vehicle treatment installation for the driver of a vehicle to be treated.

The invention achieves this task through a vehicle treatment installation and a method for its operation as described herein. Advantageous constructions and useful improvements of the invention are also described herein.

A vehicle treatment installation according to the invention is characterized by a display device that is visible to the driver of the vehicle during the drive-in process for displaying the image and at least one mark. A method according to the invention for operating a vehicle treatment installation is characterized by the steps a) creating an image of the drive-in area and vehicle with the camera and b) displaying the image and at least one mark in the display device. Due to the quickly comprehensible display of the vehicle in the display device with respect to the mark, the driver can bring the vehicle into the desired treatment position in a quick, controlled way that is, above all, adapted to the degree of possible incorrect positioning.

Preferably, the camera could be mounted above the drive-in area, in order to thus allow, in a simple way, a top view of the drive-in area, the vehicle, and the mark.

The camera can be designed preferably for recording moving images, e.g., as a digital video camera that creates a continuous digital recording of the drive-in area. It is essential that the camera can record the drive-in process of the vehicle with sufficient time resolution, for example, at 12 to 15 images per second.

Advantageously, the mark can be physically mounted completely or partially in the drive-in area, for example, set in the base of the vehicle treatment installation. In this way, the driver can use the mark as a drive-in aid in the conventional way.

Additionally or alternatively, the mark could be virtually superimposed with the correct orientation, completely or partially, in the image recorded by the camera. In this way, the mark can always be displayed to a certain extent clearly and recognizably in the display device. Poor lighting of the drive-in area or a greatly dirtied base of the drive-in area does not influence the display. The quality of the recording also does not matter. In this way, the area to be recorded by the camera can be reduced, so that the camera delivers an image with higher resolution for a camera of the same resolution. Alternatively, for a reduced camera resolution, the data quantity to be transmitted from the camera to the display is reduced. Also here, areas of the mark covered by the vehicle and not visible to the camera could also be nevertheless displayed.

The mark could advantageously comprise a stop mark running perpendicular to the drive-in direction on the front end of the drive-in area in the drive-in direction. Here it is advantageous that the driver can identify the stop mark in the display device even if it is no longer visible from the driver position due to the hood of the vehicle.

The mark can comprise at least one drive-in mark running along the drive-in direction, e.g., a central, wide longitudinal strip on which the vehicle drives along.

Alternatively, the mark could have two drive-in mark strips that run along the drive-in direction and are oriented symmetric to a central plane running parallel to the drive-in direction and centered to the treatment gantry. Such drive-in mark strips act somewhat as drive-in guides, even if they do not have a funnel-shaped profile. The drive-in mark strips can each have preferably at least two strips that have different visual configurations and run in the drive-in direction, so that the driver can easily determine whether he is steering the vehicle centered to the central plane or with lateral offset. If the drive-in mark or drive-in mark strips are mounted on the base of the drive-in area, they are used as additional drive-in aids. In this case, the superposition of virtual marks in the image could also be eliminated.

In one advantageous construction of the invention, the display device could have a monitor system 17 provided in the vehicle, wherein the image and also the display of the mark are transmitted wirelessly to the monitor system 17. In this way, for example, a monitor system of a navigation device could be used in the vehicle as a display device whose use is already familiar to the driver.

BRIEF DESCRIPTION OF THE DRAWINGS

Additional special features and advantages of the invention are given from the following description of a preferred embodiment with reference to the drawings. These show:

FIG. 2 shows a schematic top view of the vehicle treatment installation of FIG. 1 with a vehicle in the drive-in area in a first position; and FIG. 3 shows a schematic top view of FIG. 2 with the vehicle in the drive-in area in a second position.

DETAILED DESCRIPTION OF THE INVENTION

Figures 1, 1A:
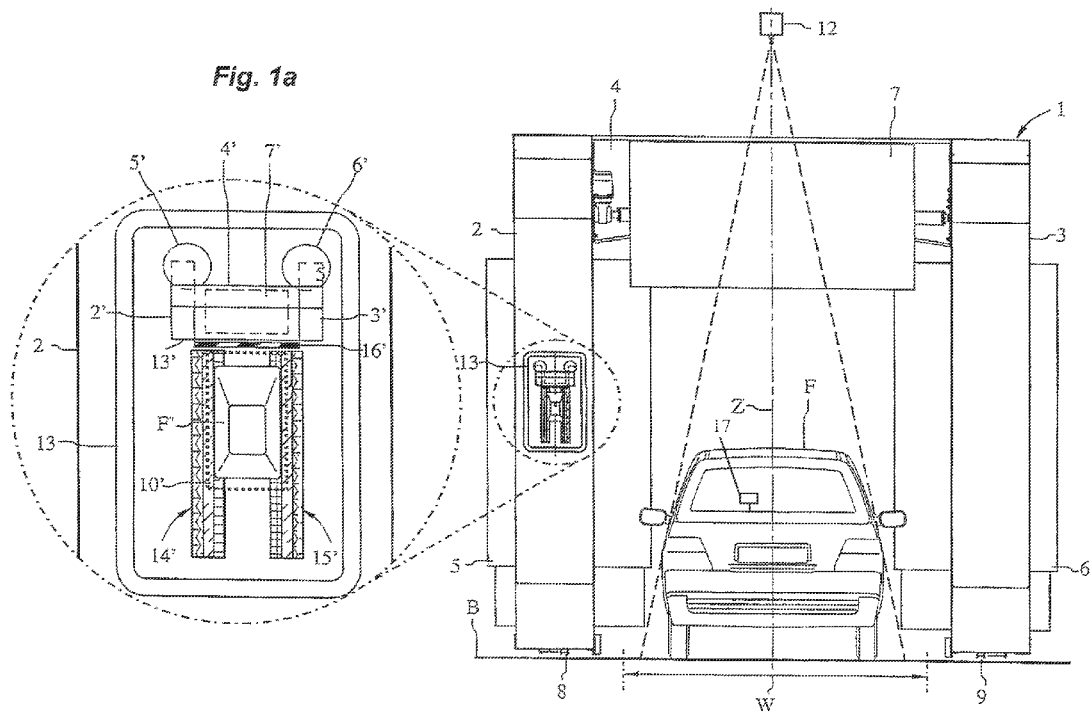
FIG. 1 shows a schematic front view from the drive-in side of a vehicle treatment installation according to the invention.
FIG. 1a shows an enlarged view of the display device of FIG. 1 mounted on the vehicle treatment installation.

FIG. 1 shows a schematic front view of a vehicle treatment installation constructed as a vehicle gantry washing installation from the drive-in side with vehicle F that has already entered. The construction of such gantry washing installations is common, in principle, for those skilled in the art.

The gantry washing installation has a treatment gantry constructed as a washing gantry 1 with two vertical gantry posts 2 and 3 that are connected to each other by a horizontal gantry traverse 4. On the washing gantry 1 there are two vertical washing brushes 5 and 6 that can be driven to rotate and can move on the gantry traverse 4 perpendicular to the drive-in direction E, in order to clean the front, sides, and rear end of a vehicle F to be washed. Between the gantry posts 2 and 3 there is a horizontal washing brush 7 that can be driven in a height-adjusting and rotating way, in order to clean the front, horizontal surfaces, such as the hood, windshield, roof, trunk, etc., as well as the rear end of the vehicle F. The washing gantry 1 can move on roller arrangements 8 and 9 on rails, not shown in FIG. 1, along a drive-in direction E perpendicular to the plane of the drawing in FIG. 1. An open treatment width W laterally limits a treatment area 10 between the gantry posts 2 and 3 in which the vehicle F can still be washed or treated in some other way.

Above the washing gantry 1 and the drive-in area 11 designated in FIGS. 2 and 3, there is a camera 12 constructed as a digital video camera that can record an image of a top view of the drive-in area 11 together with the vehicle F located therein.

In the present construction of the invention, in particular, as can be seen from FIG. 1, the camera 12 can record the entire width and length of drive-in area 11. For this purpose, the camera 12 is oriented in the middle relative to the washing gantry 1 and especially relative to the open treatment width W, thus it lies in an imaginary central plane Z that runs parallel to the drive-in direction E and in the middle relative to the washing gantry 1 and especially relative to the open treatment width W.

If the vehicle F enters the drive-in area 11, then a portion of the drive-in area 11 is covered by the vehicle F, indeed, by more than just the vehicle contours shown in FIGS. 2 and 3. The size of this additionally covered area depends on the height at which the camera 12 is mounted over the drive-in area 11, as well as the width of the vehicle F. In order to be able to also record the covered areas, advantageously, two cameras offset perpendicular to the drive-in direction E could be used, whose images could then be combined easily in an image-processing unit due to the known spatially fixed mounting of the cameras. If the drive-in area is very long, several cameras could also be mounted offset in the drive-in direction E, e.g., in the central plane Z one behind the other, and optionally also on both sides of the central plane Z. It is decisive that the cameras can record the drive-in area 11 including the entering vehicle F so that a top view from above can be generated from the images.

In the present embodiment, the gantry washing installation is set up in a not-shown washing bay on whose ceiling the camera 12 is mounted. Alternatively, the camera 12 could also be mounted on a frame or similar equipment.

The image of the drive-in area 11 and the vehicle F recorded by the camera 12 is displayed on a display device constructed as a monitor 13. The monitor 13 is attached to the gantry port 2 on the left in FIG. 1, so that it can be viewed by the driver of the vehicle F during the entire drive-in process. In the case of a very long drive-in area 11, advantageously another display device could also be provided in the drive-in direction E in front of the monitor 13 mounted on the gantry post 2. In addition, advantageously, display devices could also be provided on both gantry posts 2, 3 of the gantry traverse 4, on both sides, and/or above the drive-in area 11.

As emerges from FIGS. 2 and 3, on the base B of the gantry washing installation, a mark is provided in the form of drive-in mark strips 14, 15 and also a stop mark 16. The mark can be produced by casting in the base B, by painting, or other suitable means.

The drive-in mark strips 14, 15 run along the drive-in area 11 parallel to the drive-in direction E and parallel and symmetric to the central plane Z. Both drive-in mark strips 14, 15 have three strips 14a, 14b, 14c or 15a, 15b, and 15c that have different visual characteristics and are also arranged symmetric to the central plane Z in the drive-in mark strips 14 and 15, respectively. In addition, as far as is possible and useful, only the drive-in mark strips 14 on the left in FIGS. 2 and 3 are described and the corresponding statements also apply equally for the right drive-in mark strips 15.

The inner strip 14a with respect to the central plane Z has a checked pattern on green background that can be easily recognized by the driver of the vehicle F while driving into the drive-in area 11. The middle strip 14b is provided with diagonal lines on a yellow background, while the outer strip 14c has a honeycomb structure on a red background. The drive-in mark strip 14 is composed of the known traffic light colors from the inside to the outside, which is advantageous, because the driver is familiar with this color sequence and steers into the middle, centered position due to their signaling effect.

The stop mark 16 is formed at the front end of the drive-in area 11 in the base of the gantry washing installation as diagonal, striped bars in black-yellow colors and runs perpendicular to the drive-in direction E and centered relative to the central plane Z. The width of the stop mark 16 presently corresponds to the open width between the gantry posts 2, 3, thus, the maximum possible vehicle width. In this way, the driver of the vehicle F could quickly and reliably determine in the image displayed in the monitor 13 whether his vehicle F is too wide for the gantry washing installation.

Preferably, the stop mark 16 is designated differently than the drive-in mark strips 14, 15. In addition, it is advantageous when there is a small distance in the drive-in direction E between the front end of the drive-in mark strips 14, 15 and the stop mark 16.

The functioning of the invention, especially the marks 14, 15, 16, will now be explained with reference to FIGS. 1a, 2, and 3.

As the vehicle F is driven into the gantry washing installation, an image of the top view of the drive-in area 11 is recorded continuously with the camera 12, that is, also the entering vehicle F. This image is displayed immediately, that is, in real time, on the monitor 13. For distinguishing the real components of the gantry washing installation from their representations in the image displayed on the monitor 13, the representations will be designated by an apostrophe added to the reference symbols of the real components, wherein, in FIG. 1a, for reasons of clarity, the image is shown only schematically. Actually, the image shown in the monitor 13 shows a complete representation of the area recorded by the camera 12, including a possibly entering vehicle F. In FIG. 1a, the covered areas of the base B around the vehicle F are also shown that cannot be recorded, as described above, due to the recording with the one, centered camera 12.

The image in the monitor 13 shows the washing gantry 1 with its components, namely gantry posts 2', 3', gantry traverse 4', vertical side brushes 5' and 6', as well as horizontal washing brush 7'. Furthermore, on the monitor 13, the recorded drive-in marks 14', 15', the stop mark 16', the treatment area 10', and the position of monitor 13' are to be seen. The image also shows the representation of the vehicle F', wherein the motion of the vehicle F in the drive-area 11 is also displayed.

In an illustrated, not-shown construction, all of the components of the gantry washing installation that are stationary during the drive-in of the vehicle F can also be shown additionally or exclusively "virtually" in the monitor 13, because the positions of the camera 12 and the washing gantry 1 are linked with each other, fixed in place in the rest position before the washing, like also the positions of the drive-in marks 14 and 15 and also the stop mark 16. For example, the drive-in mark strips 14', 15', and/or the stop mark 16' can be generated in software and can be superimposed in the digital image of the camera 12, so that the areas of the base B covered by the vehicle F, as described above, next to the vehicle F can also be displayed.

In contrast, the representation F' of the real vehicle F by the camera 12 is shown directly in the monitor 13, so that no complicated measurements or computing-time-intensive calculations of a "virtual" vehicle must be performed. Instead, the driving into the drive-in area 11 with respect to the real marks 14, 15, 16 and optionally virtual marks 14', 15', 16' are displayed directly to the driver of the vehicle F through the image of the camera 12. Consequently, the driver can immediately identify necessary driving-direction corrections, perform appropriate steering corrections, and immediately sees the result of the steering corrections. He can also immediately identify how large the deviations from the ideal treatment position are and can adapt the steering corrections appropriately. In this way, over-steering is advantageously prevented. In addition, during the drive-in process, the driver could perform the coarse adjustment based on the marks 14, 15, 16 applied to the base B and then the fine adjustment of steering corrections based on the image shown in the monitor 13.

FIGS. 2 and 3 each show a drive-in process of the vehicle F, each with different positions of the vehicle F in the drive-in area 11.

In FIG. 2, at the end of the drive-in process, the vehicle F is optimally located centered with respect to the central line Z between the left and right drive-in mark strips 14 and 15, that is, in a laterally optimal washing position. This is displayed to the driver in FIG. 1a who thus can identify immediately and just through consideration of the monitor 13 that he must perform no steering corrections. The driver also recognizes on monitor 13 that he still must drive forward a small distance until he reaches the stop mark 16, thus placing his vehicle is in the optimal treatment position. Without the representation of the drive-in area 11 together with the vehicle F in the image in the monitor 13, the driver could not identify this short distance because the stop mark 16 located on the base B would be covered by the hood of the vehicle F.

In the case of known vehicle washing installations, for generating a stop signal, two light barriers could be provided one behind the other in the drive-in direction E instead of the stop mark 16, wherein the front light barrier in the drive-in direction E outputs a stop signal to the driver when the car has driven past it. Due to its reaction time, if it is not stopped quickly enough, but instead also drives past the second, subsequent light barrier, then a "reverse" signal would be displayed. The driver must then reverse the vehicle F, wherein many drivers here reverse too far, so that the entire procedure begins with repeated forward driving from the front and under some circumstances must even be repeated several times.

In FIG. 3, the vehicle is located too far to the right of the central plane Z, which the driver can quickly identify with reference to the top view in the monitor 13 (not shown in perspective). He can also identify that the vehicle could be cleaned without damage but, under some circumstances, with poorer cleaning results. He also recognizes that he can no longer bring the vehicle F into a better treatment position on the short, remaining distance to the stop mark 16, but instead must reverse and repeat the drive-in process. In this way it is avoided that the driver positions his vehicle F in an even worse position due to unnecessary and not-useful steering corrections at the end of the drive-in process. If the vehicle F at the lateral offset toward the right shown in FIG. 3 were still at the beginning of the drive-in area 11, then the driver could immediately identify that he could easily bring the vehicle F into the central and middle treatment position with respect to the central plane Z by steering moderately to the left and later steering in the drive-in direction E.

Through the quickly comprehensible representation of the vehicle F in the image in monitor 13 with respect to the marks 14, 15, 16 or 14', 15', 16', the driver can bring the vehicle F into the desired treatment position in a way that is quick, controlled and, above all, adapted to the degree of a possible incorrect position. In particular, he is not instructed with direction signals, possibly displayed with a short time delay, that he must then react to with a steering stop. The driver also immediately sees the result of his steering corrections.

For the overwhelming majority of vehicles, because the driver does not sit in the middle of the vehicle, but instead on the right or left side, he also does not compensate the offset between the imaginary central plane Z and his sitting position due to the display of the vehicle F in the monitor 13, which is done successfully by only few drivers the first time, if at all.

The invention claimed is:

1. A vehicle treatment installation comprising:
   a drive-in area for a vehicle to be treated;
   a treatment gantry that can move along a drive-in direction;
   at least one camera for creating an image of the drive-in area and the vehicle to be treated;
   a display device for displaying the image, the display device visible to a driver of the vehicle to be treated during a drive-in process; and
   at least one mark, wherein the display device includes a monitor system that is locatable in the vehicle to be treated in which the image and also a display of the at least one mark can be transmitted wirelessly to the monitor system.

2. The vehicle treatment installation according to claim 1, wherein the at least one camera is mounted above the drive-in area.

3. The vehicle treatment installation according to claim 1, wherein the at least one camera is designed for creating moving images.

4. The vehicle treatment installation according to claim 1, wherein the at least one mark is physically mounted completely or partially in the drive-in area or virtually superimposed completely or partially onto the image.

5. The vehicle treatment installation according to claim 1, wherein the at least one mark comprises a stop mark running perpendicular to the drive-in direction on a front end of the drive-in area in the drive-in direction.

6. The vehicle treatment installation according to claim 5, wherein the stop mark is as wide as an open treatment width between gantry posts of the treatment gantry.

7. The vehicle treatment installation according to claim 5, wherein the stop mark is a crossbar mounted perpendicular to the drive-in direction on a base of the drive-in area.

8. The vehicle treatment installation according to claim 1, wherein the at least one mark comprises at least one drive-in mark running along the drive-in direction.

9. The vehicle treatment installation according to claim 1, wherein the at least one mark has two drive-in mark strips that run along the drive-in direction and are oriented symmetric to a central plane running parallel to the drive-in direction and centered to the treatment gantry.

10. The vehicle treatment installation according to claim 9, wherein the drive-in mark strips each have at least two strips that have different visual configurations and run in the drive-in direction.

11. The vehicle treatment installation according to claim 9, wherein the drive-in mark or drive-in mark strips are mounted on a base of the drive-in area.

12. A method for operating a vehicle treatment installation having a drive-in area for a vehicle to be treated, a treatment gantry that can move along a drive-in direction, at least one camera, and a display device that is visible to a driver of the vehicle to be treated during a drive-in process, wherein the display device includes a monitor system that is locatable in the vehicle to be treated, the method comprising:
   a) creating an image of the drive-in area and vehicle to be treated with the camera;
   b) transmitting the image and also a display of at least one mark wirelessly to the monitor system; and
   c) displaying the image and the at least one mark in the monitor system of the display device.

13. The method according to claim 12, wherein the vehicle treatment installation is the vehicle treatment installation of claim 1.

14. The method according to claim 13, wherein the at least one mark is physically mounted completely or partially in the drive-in area and is recorded with the image by the camera or is virtually superimposed completely or partially on the image.

15. The method according to claim 12, wherein step a) further comprises recording a top view of the vehicle to be treated from above.

16. The method according to claim 12, wherein the image in step a) is a continuous video recording.

17. A vehicle treatment installation comprising:
   a drive-in area for a vehicle to be treated;
   a treatment gantry that can move along a drive-in direction;
   at least one camera for creating an image of the drive-in area and the vehicle to be treated;
   a display device for displaying the image, the display device visible to a driver of the vehicle to be treated during a drive-in process;
   at least one mark; and
   a monitor system placed in the vehicle to be treated, wherein the image and also a display of the at least one mark can be transmitted wirelessly to the monitor system.

18. The vehicle treatment installation according to claim 17, wherein the image created by the camera includes a representation of the vehicle to be treated together with a representation of the at least one mark.

19. A vehicle treatment installation comprising:
a drive-in area for a vehicle to be treated;
a treatment gantry that can move along a drive-in direction;
at least one camera for creating an image of the drive-in area and the vehicle to be treated;
a display device for displaying the image, the display device visible to a driver of the vehicle to be treated during a drive-in process; and
at least one mark; wherein the image created by the camera includes a representation of the vehicle to be treated together with a representation of the at least one mark.

20. A method for operating a vehicle treatment installation having a drive-in area for a vehicle to be treated, a treatment gantry that can move along a drive-in direction, at least one camera, a display device that is visible to a driver of the vehicle to be treated during a drive-in process, the method comprising:
a) creating an image of the drive-in area and vehicle to be treated with the camera, wherein the image created by the camera includes a representation of the vehicle to be treated together with a representation of at least one mark; and
b) displaying the image and the at least one mark in the display device.

\* \* \* \* \*